Dec. 29, 1970  J. SMITH  3,550,193

FISH GUTTING MACHINE

Filed July 12, 1968  5 Sheets-Sheet 1

Inventor
JAMES SMITH
By Young & Thompson
Attorneys

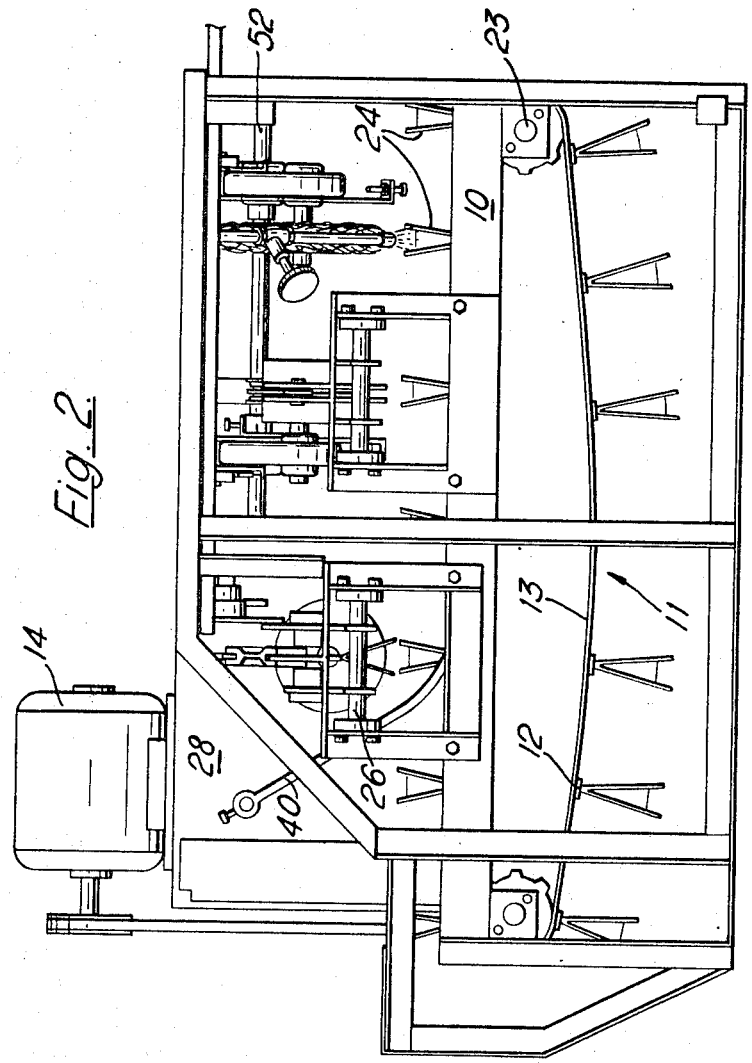

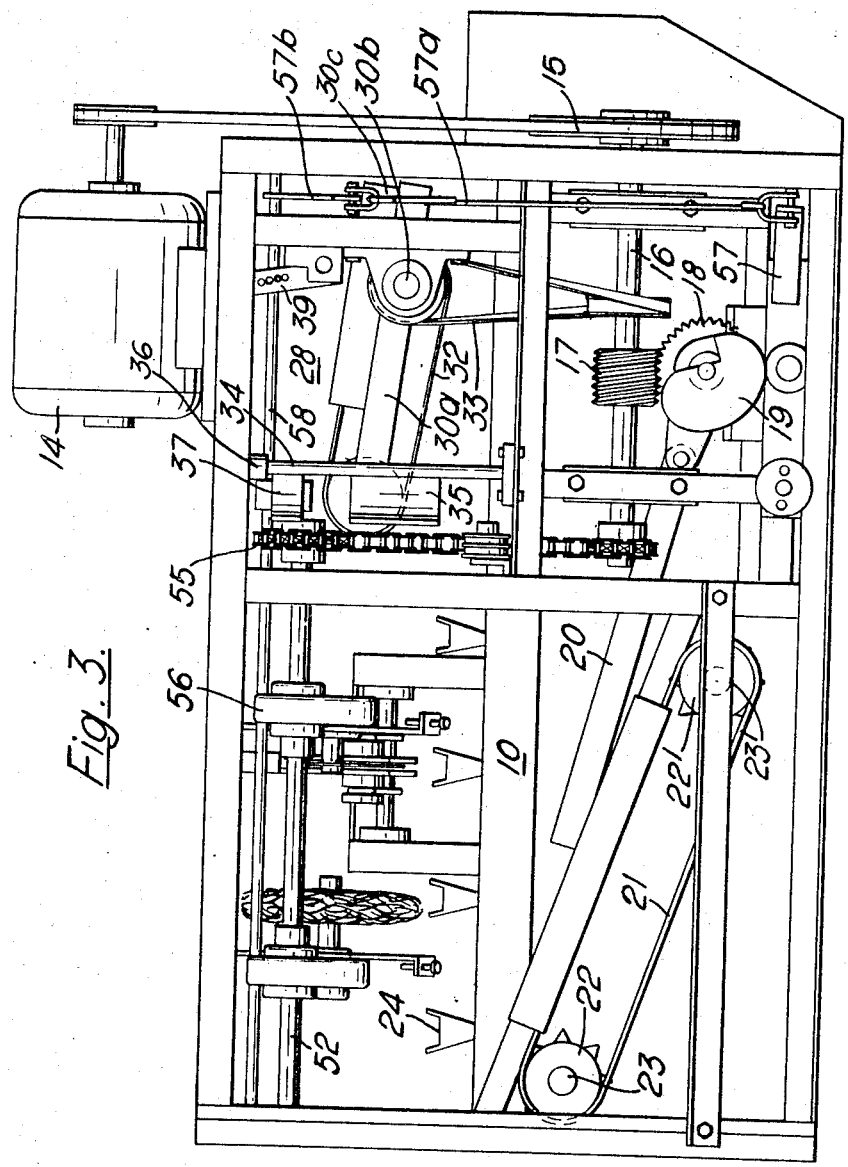

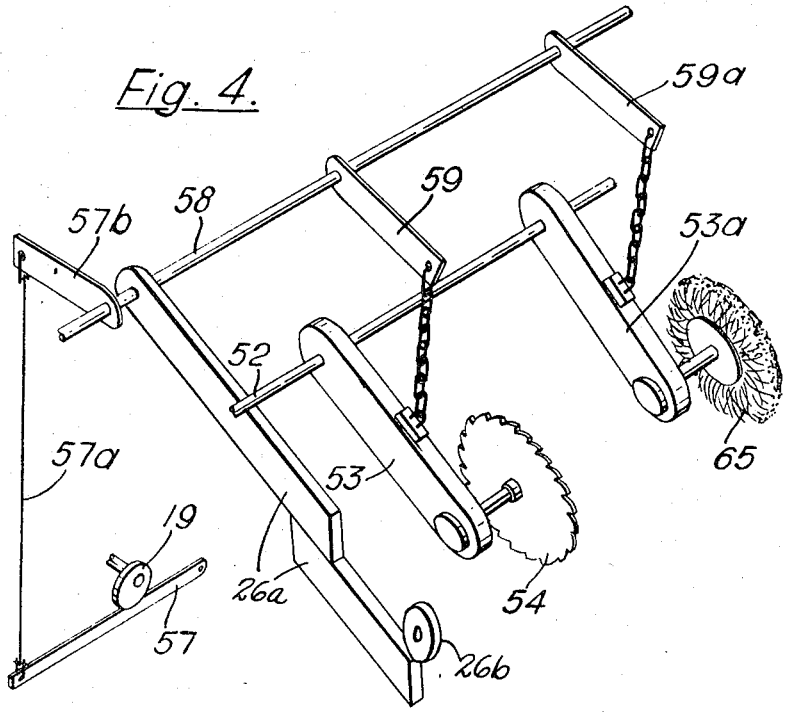
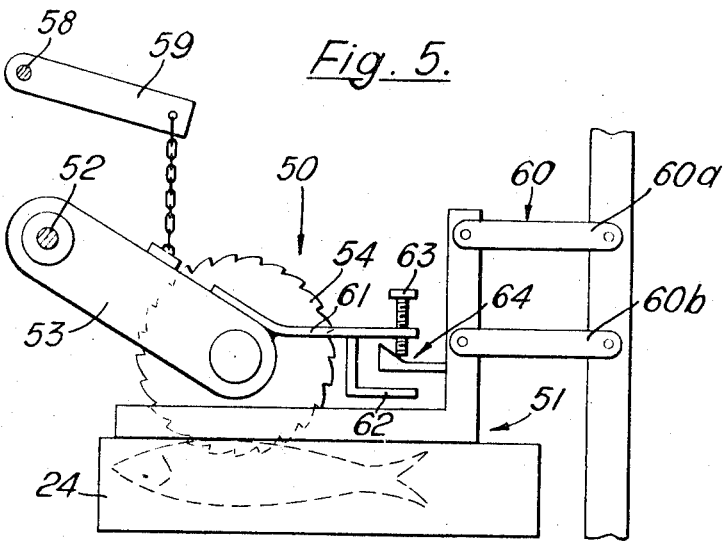

United States Patent Office 3,550,193
Patented Dec. 29, 1970

3,550,193
FISH GUTTING MACHINE
James Smith, Berry Farm, Scalloway, Shetland, Scotland
Filed July 12, 1968, Ser. No. 744,364
Int. Cl. A22c 25/14
U.S. Cl. 17—58                2 Claims

ABSTRACT OF THE DISCLOSURE

A fish gutting machine having an endless conveyor formed by a number of troughs into which the fish is placed and two blade mechanisms, one for cutting the fish's throat and the other for slitting the fish's belly thereby to free the gut automatically, said mechanism being automatically adjustable to accommodate different sizes of fish.

---

This invention relates to a fish-gutting machine, particularly but not exclusively for gutting white fish.

A difficulty in providing a machine for gutting white fish is that the fish vary considerably in size so that the machine may fail to gut properly.

It is an object of the present invention to obviate or mitigate the aforesaid difficulty.

The present invention is a fish-gutting machine including a conveyor for carrying each fish in a transverse location, a gutting blade located transversely of the conveyor and mounted on a carrier pivotally mounted at one side of the conveyor to swing down across the conveyor to cut the belly of a fish from the throat to the gut hole, a gutting feeler device, pivotally mounted on the opposite side of the conveyor in transverse alignment with the gutting blade to engage the fish and the gutting blade carrier and limit the pivotal movement of the carrier and thus the length of the cut, and means for moving the conveyor intermittently so that the gutting operation takes place when the conveyor is stationary.

Preferably, a throat-cutting blade is provided at the leading end of the conveyor, ahead of the gutting blade, said throat-cutting blade being located parallel with the direction of movement of the conveyor to cut the throat of the fish, a "throat-cutting" feeler device being located in the path of the fish for engagement therewith and coupled to said throat cutting blade to move the blade transversely of the conveyor so that the blade is positioned to cut the fish's throat.

Preferably also, said "throat-cutting" feeler device is coupled to the throat-cutting blade by a lever mechanism, a vertical rod turnable about its longitudinal axis and mounting a cam engaged by the lever mechanism and a plate mounted on the rod to engage the spindle of the throat cutting blade.

Preferably also, the gutting blade is a coarse circular saw blade.

Preferably also, the throat cutting blade comprises two parts, a blunt disc and a sharp edged disc clamped together on a spindle, the sharp edge extending beyond the edge or shoulder of the blunt disc.

Preferably also, a plurality of longitudinally spaced transversely located fish troughs are mounted on the conveyor, each to receive a fish and preferably the side walls of each trough have cut away portions to allow passage of the trough past the throat cutting feeler and operation of the throat cutting blade.

Preferably also, means for cleaning out the gutted fish are located at the trailing end of the conveyor behind the gutting blade, said means comprising a circular brush mounted transversely across the conveyor and a water nozzle transversely directed at the brush.

Figure 1:
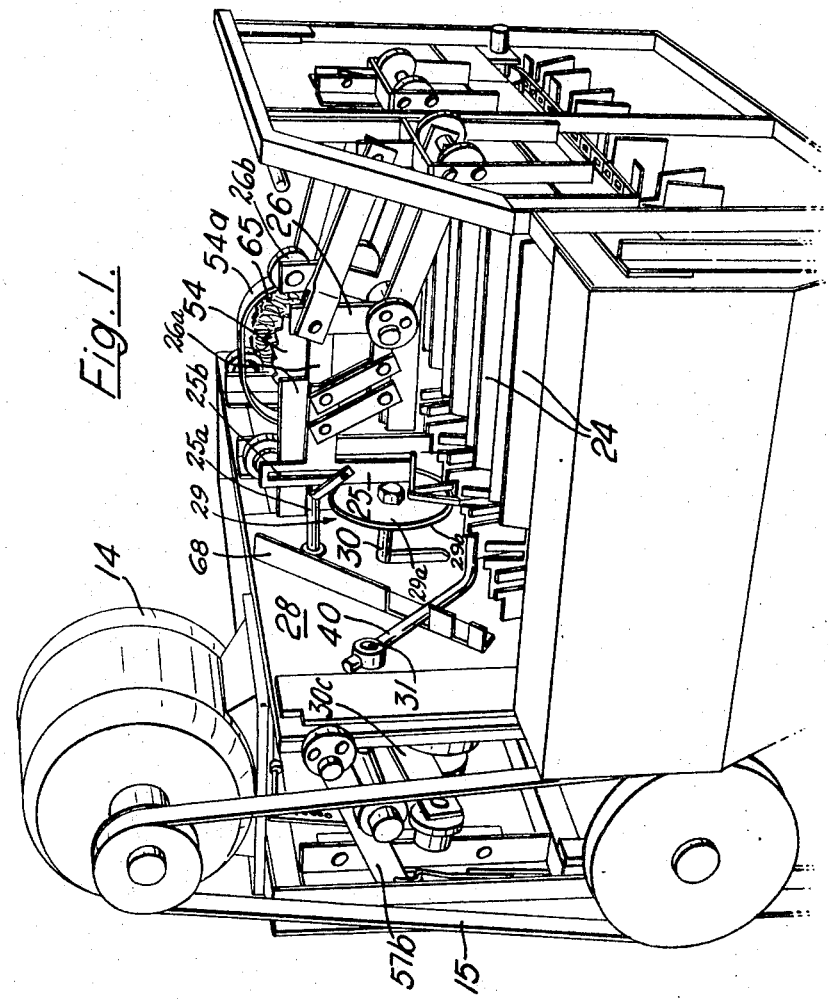
Figure 6:
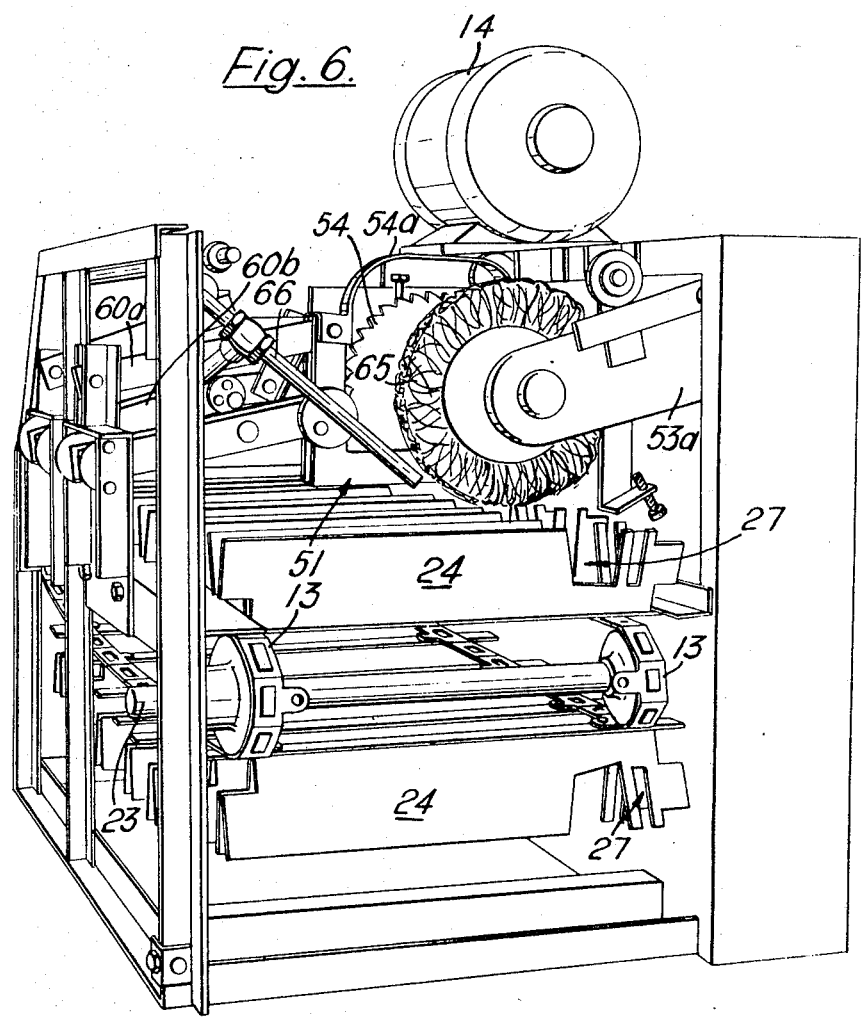

An embodiment of the present invention will now be described by way of example, with reference to the accompanying drawings, in which:

FIG. 1 is a perspective view from the leading end of a fish gutting machine according to the present invention;
FIG. 2 is a front elevation;
FIG. 3 is a rear elevation;
FIG. 4 is an illustrative perspective of a linkage for pivoting the gutting blade and washing brush;
FIG. 5 is an end elevation of the gutting blade and feeler; and
FIG. 6 is a perspective view from the trailing end of the machine.

Referring firstly to FIGS. 1 to 3 of the drawings, a fish gutting machine includes a table 10 mounting a horizontal endless conveyor belt 11 (FIG. 2). The belt 11 is formed of transverse slats 12 of, for example nylon, linked together at their ends by two endless chains 13 and power means 14 is provided to move the conveyor intermittently so that it is stationary during the gutting operation.

The power means 14 is an electrical motor which operates the conveyor through a chain drive 15 to a drive shaft 16 located below the table 10. The drive shaft 16 has a worm thread 17 engaging a gear wheel 18 fixedly connected to a crank (not shown) mounted on the opposite end of a shaft carrying a cam 19. The cam, when rotated, operates a push rod 20 which intermittently engages an endless chain 21 and said chain 21 is carried on two sprocket wheels 22, 22′ which are mounted on axles 23, 23′. The conveyor chains 13 pass over sprockets secured to axle 23, and therefore, intermittent movement of the push rod 20 causes intermittent movement of the conveyor due to the chains 13 thereof engaging the sprockets of the axle 23.

Troughs 24 are mounted on some or all of the slats 12 each to carry a fish lying on its back. These troughs are uniform although the fish to be carried thereon may vary considerably in size. The troughs 24 are open ended, substantially coffin shaped and of V-shape in cross section and the fish is placed therein with its head towards one side of the conveyor. The V-shape centralises the fish no matter what its size is and the coffin shape holds the fish straight and firmly.

Along one side of the table 10, namely, the side nearest the fish's head, is an upstanding board 28 which mounts gutting and other control mechanisms hereinafter described. On the opposite side of the table 10 there is an upstanding frame 67 which carries pivotal linkages connected to the control mechanisms.

A first or throat-cutting disc blade 29 is located close to the leading end of the conveyor 11, i.e., at the beginning of the upper run and is mounted parallel to the direction of movement of the conveyor. The throat-cutting blade 29 is mounted on a transverse spindle 30 which is movable transversely over a short distance, for example, two inches, by a feeler device coupled thereto. The spindle 30 is movable vertically to raise the blade for passage of a fish thereunder and then to lower the blade to cut the fish's throat. The blade 29 is driven from the drive shaft 16 by two endless belts 32, 33. Said blade 29 comprises two parts, a blunt disc 29a and a sharp-edge disc 29b clamped together on the spindle 30. The sharp edge extends, for example, 1/16″ beyond the edge or shoulder of the blunt disc.

The spindle 30 is carried on arm 30a located behind the board 28. This arm is pivoted intermediate its ends at 30b and one end 30c is engaged by an overlying pivotal arm 57b. This arm 57b is pivotal on actuation of the cam 19 (as will be hereinafter described in detail) and when pulled down, the arm 57b pushes down end 30c thereby raising the arm 30a about pivot 30b and also the disc 29. This raised position is shown in the drawings.

The arm 57b is fixedly mounted at one end of a rotatable shaft 58 (FIG. 4) which extends along the rear face of board 28.

A vertical bar 25 which has an inverted V-shaped lower end is located transversely adjacent to the blade 29 (having a clearance of about ⅛″) and is carried on a parallel linkage 26 which is mounted on frame 67 and which extends across the table 10. The linkage 26 is coupled to the rotatable shaft 58 by an arm 26a one end of which is fixedly mounted thereon and its other end engages under a roller 26b which forms part of the parallel linkage 26. Rotation of the shaft 58 (which is by means of the cam 19 is hereinafter described in detail) pivots arm 26a which lifts or lowers the linkage 26 and consequently the V-shaped bar 25 in a controlled vertical movement. Each trough 24 has slits 27 in its sides (FIG. 6) to allow the V-shaped bar to move far enough downwards to engage the smallest fish.

The bar 25 is connected to a horizontal push rod 25a which is located in a vertical slot 25b so that the bar can move vertically relative to the rod 25a. The rod 25a extends through the board 28 and terminates therebehind against a plate 37 which is mounted on the vertical shaft 34. A second plate 35 is also mounted on a shaft 34 below plate 37 and engages the rear end of the spindle 30 which carries the blade 29. A cam 36 is fixedly mounted on top of shaft 34 and is actuated by a lever mechanism 39 which causes the shaft 34 to turn, thus moving the plates 35, 37 and consequently moving the push rod 25a and spindle 30 away from the front face of the board 28 or allowing a spring urged movement of the rod 25a or spindle 30 towards the board. The blade 29 and V-shaped bar 25 thus move together transversely so that a clearance between them is retained.

The lever mechanism 39 is actuated by the feeler device comprising a feeler arm 40 located at the front of the board 28 at the leading end of the conveyor and fixedly mounted on a spindle 31. The feeler arm 40 lies in the plane of movement of the conveyor and is angled downward to terminate adjacent to the lower edge of the throat-cutting blade 29. This feeler 40 engages the head of a fish as the trough passes thereunder and the end of the feeler is pivoted upwards by a certain amount thus actuating the lever mechanism 39. According to the size of the fish, the V-shaped bar 25 and the throat-cutting blade 29 move transversely across the conveyor by a corresponding amount and on the downward movement the bar centres the fish and the blade engages the fish's throat and cuts it through to the backbone to free the guts from the head of the fish.

In cutting the fish's throat, the sharp edge is the first to contact the flesh. The blade parts the flesh and the blunt shoulder follows through; however, on touching the backbone, the blade makes a nick in the bone but the blunt shoulder then abuts the bone and prevents the sharp edge from cutting any deeper. In this way, the first disc blade 29 will cut the fish's throat but stops automatically at the backbone regardless of the size of fish being gutted.

A second or gutting disc blade assembly 50 (FIG. 5) is located towards the trailing end of the conveyor and is coupled to a second or gutting feeler 51. The gutting blade assembly 50 is pivotally mounted on a spindle 52 located behind the board 28 below the horizontal shaft 58 and includes an arm 53 pivotal on spindle 52 and extending transversely through the board 28 and a blade 54 rotatably mounted on the arm 53 transversely above the conveyor 11. The blade 54 is rough-toothed so as to make a cut of ¼″ to ⅜″ wide along the fish's belly when it is pivoted downwards across the fish and it is rotated via a chain drive system from the power means 14.

The gutting blade 54 has a guard plate 54a (FIGS. 1 and 6) located above it. The drive system comprises an endless chain 55 (FIG. 3) connecting the drive shaft 16 with the spindle 52 and a chain or belt 56 connects the spindle 52 with the blade 54.

The arm 53 has a controlled pivotal up and down movement which is actuated by the cam 19. This cam (FIGS. 3 and 4) pushes down a lever 57 located therebelow and the lever 57 pulls down a vertical rod 57a attached thereto. The upper end of rod 57a is connected to the pivotal arm 57b fixedly mounted on the horizontal shaft 58 and another arm 59 is mounted on the shaft 58 above the arm 53. A chain connects the arms 59 and 53 and when rod 57a is pulled down, arm 57b is also pulled down and arm 59 is pivoted upwards to raise arm 53. (The throat cutting blade 29 which is controlled by the arm 26a mounted on the shaft 58 is also raised at this moment.) As the cam 19 moves round its axis, downward pressure is removed from lever 57 and arms 26a and 53 are then free to drop again to allow each of their associated blades to engage a fish; however, the amount of drop of the gutting blade 54 is controlled by the gutting feeler 51.

The gutting feeler 51 is carried by a parallel linkage 60 which is pivotally mounted on the table 10 at the same side as the inverted V bar linkage 26 and includes a pair of vertically spaced parallel links 60a, 60b. The feeler 51 is L-shaped and split along its lower limb to allow the blade 54 to pass therethrough. In use, the feeler 51 rests on the fish holding it firmly to allow a more efficient saw cut. The linkage is of relatively heavy material, for example, stainless steel.

The arm 53 has an upper finger 61 extending therefrom across the conveyor, and an L-shaped lower finger 62 depends from finger 61. The upper finger 61 has an adjustable screw 63 located therein and this screw 63 abuts a cam 64, the upper face of which is inclined upwards, and which projects transversely from the upper limb of the feeler 51 when the arm 53 pivots downwards; when the arm 53 pivots upwards the lower finger 62 lifts the feeler 51 clear of the fish.

The vertical distance between the upper and lower fingers 61, 62 is sufficient to allow the gutting blade 54 to be raised above the lower edge of the feeler 51 before the lower finger 62 engages the cam 64. Thus, the gutting blade 54 is clear of the fish before the feeler 51 is lifted. On lowering the blade 54 and feeler 51, the lower finger 62 is in contact with the cam 64 until the feeler 51 is stopped by the fish. The gutting blade 54 and its arm 53 continue to pivot downwards until the set screw 63 engages the inclined cam 64. The further down the feeler 51 is (i.e., for small fish), the further up the incline will be the set screw 63, thus allowing a smaller portion of the blade 54 to extend below the feeler 51.

The position of the feeler 51 therefore determines the length and depth of the arc made by the pivoting blade 54. The effect of this is to adjust the movement of the blade so that it cuts along the fish's belly from the throat to the gut hole where the guts are attached to the fish's body. By cutting to the gut hole, the guts are freed and any further cutting would be unnecessary and wasteful. Thus, for a small fish, the arc is deeper than for a larger fish so that the cut is from the throat to the gut hole no matter the size of fish.

A cleaning wheel, i.e. a rotatable circular brush 65 is pivotally mounted across the conveyor at the trailing end to engage the cut in the fish's belly and brush out the loose guts and a nozzle 66 (FIG. 6) is provided to supply a water jet at the wheel 65. The wheel 65 is mounted on a pivotal arm 53a (FIG. 4) which is mounted on the spindle 52 and operates similar to arm 53, being raised by arm 59a.

A sheet metal cover (not shown) is normally located over the machine being supported thereon at one side by the frame 67 and at the other side by the top of board 28 and an angled flange 68 is mounted on the board and apertured to allow movement of the feeler arm 40.

The gutted fish falls from its trough as the trough turns at the end of the run to pass under the table to the leading end to receive another fish. The gutted fish is collected by any suitable means located at the trailing end of the conveyor.

In a modified machine, the throat-cutting blade 29 and feeler device 31 are omitted; and this machine is satisfactory for rough gutting.

In a further modification, the cleaning wheel 65 and nozzle 66 may be omitted.

The machine is advantageous in that it can be used for varying sizes of fish and is automatic in that the crank on camshaft of cam 19 controls the intermittent movement of the conveyor, stopping it so that a trough is under the various blades, feelers and brush. Also, the throat-cutting blade, the gutting blade and brush are pivoted downwards in a controlled timing from the cam 19 so that they operate when a stationary trough is in their line of movement.

What I claim is:

1. A fish gutting machine, especially for white fish of varying sizes, comprising a conveyor for carrying a number of fish in longitudinally spaced transverse location, a gutting blade adapted to cut the belly of each fish from the throat to the gut hole and means for moving the conveyor intermittently so that the gutting operation takes place when the conveyor is stationary, wherein the gutting blade is automatically adjustable for use on different sizes of fish, being located transversely of the conveyor and mounted on a pivotal carrier mounted at one side of the conveyor to swing down thereacross the conveyor, a gutting feeler device being pivotally mounted on the opposite side of the conveyor in transverse alignment with the gutting blade to engage the fish and the gutting blade carrier and thereby limit the pivotal movement of the carrier and thus the length and depth of the cut, according to the size of the fish located below the gutting blade.

2. A machine as claimed in claim 1 in which a throat-cutting blade is provided at the leading end of the conveyor ahead of the gutting blade, said throat-cutting blade being located parallel with the direction of the movement of the conveyor and adjustable transversely to cut the throat of the fish no matter what size it is, a throat-cutting feeler device being located in the path of the fish and in conjunction therewith and coupled to said blade to move the blade transversely of the conveyor so that the blade is positioned to cut the fish's throat, said blade comprising two parts, namely, a blunt disc, a sharp-edged disc clamped together on a spindle, the sharp edge extending beyond the shoulder of the blunt disc, said blunt disc being located on the side adapted to be nearest the fish's belly during the throat-cutting operation.

References Cited

UNITED STATES PATENTS

| | | | |
|---|---|---|---|
| 1,103,809 | 7/1914 | Mischler | 17—58 |
| 2,245,330 | 6/1941 | Danielsson | 17—54 |
| 2,246,839 | 6/1941 | Christiansen | 17—55 |
| 2,913,759 | 11/1959 | Euich | 17—54 |

LUCIE H. LAUDENSLAGER, Primary Examiner